United States Patent
Tann et al.

[15] 3,643,145
[45] Feb. 15, 1972

[54] INTERMITTENT CONTROL DEVICE

[72] Inventors: David Tann, 333 Covington Drive, Detroit, Mich. 48234; Robert A. Noetzold, 29496 Tawas St., Madison Heights, Mich. 48071

[22] Filed: Apr. 18, 1969

[21] Appl. No.: 817,451

[52] U.S. Cl............................318/443, 318/472, 15/250.12
[51] Int. Cl...........................................B60s 1/08, H02p 3/08
[58] Field of Search.......................318/443, 472, 473 WW; 15/250.02, 250.12

[56] References Cited

UNITED STATES PATENTS

| | | | |
|---|---|---|---|
| 3,487,282 | 12/1969 | Gasiorek et al. | 318/443 |
| 3,148,399 | 9/1964 | Ziegler | 15/250.12 |
| 3,351,836 | 11/1967 | Kearns | 318/443 |
| 3,417,305 | 12/1968 | Russell | 318/473 |

FOREIGN PATENTS OR APPLICATIONS

| | | | |
|---|---|---|---|
| 1,101,441 | 1/1968 | Great Britain | 318/483 UX |
| 1,050,338 | 12/1966 | Great Britain | 15/250.12 |

*Primary Examiner*—L. T. Hix
*Assistant Examiner*—Robert J. Hickey
*Attorney*—Lane, Aitken, Dunner & Ziems

[57] ABSTRACT

A control device for operating windshield wiper blades intermittently with a dwell period between wiping cycles. The length of time of the dwell periods is determined by a thermistor. The resistance of the thermistor is varied by the wiper motor current so that the length of time of the dwell periods is varied inversely with the moisture on the windshield.

6 Claims, 3 Drawing Figures

PATENTED FEB 15 1972 3,643,145
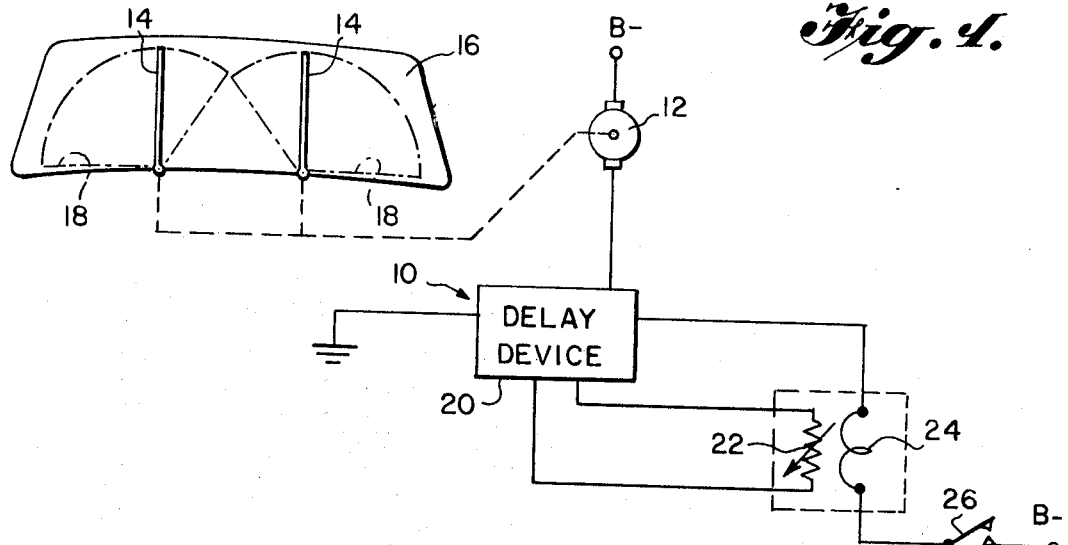
Fig. 1.
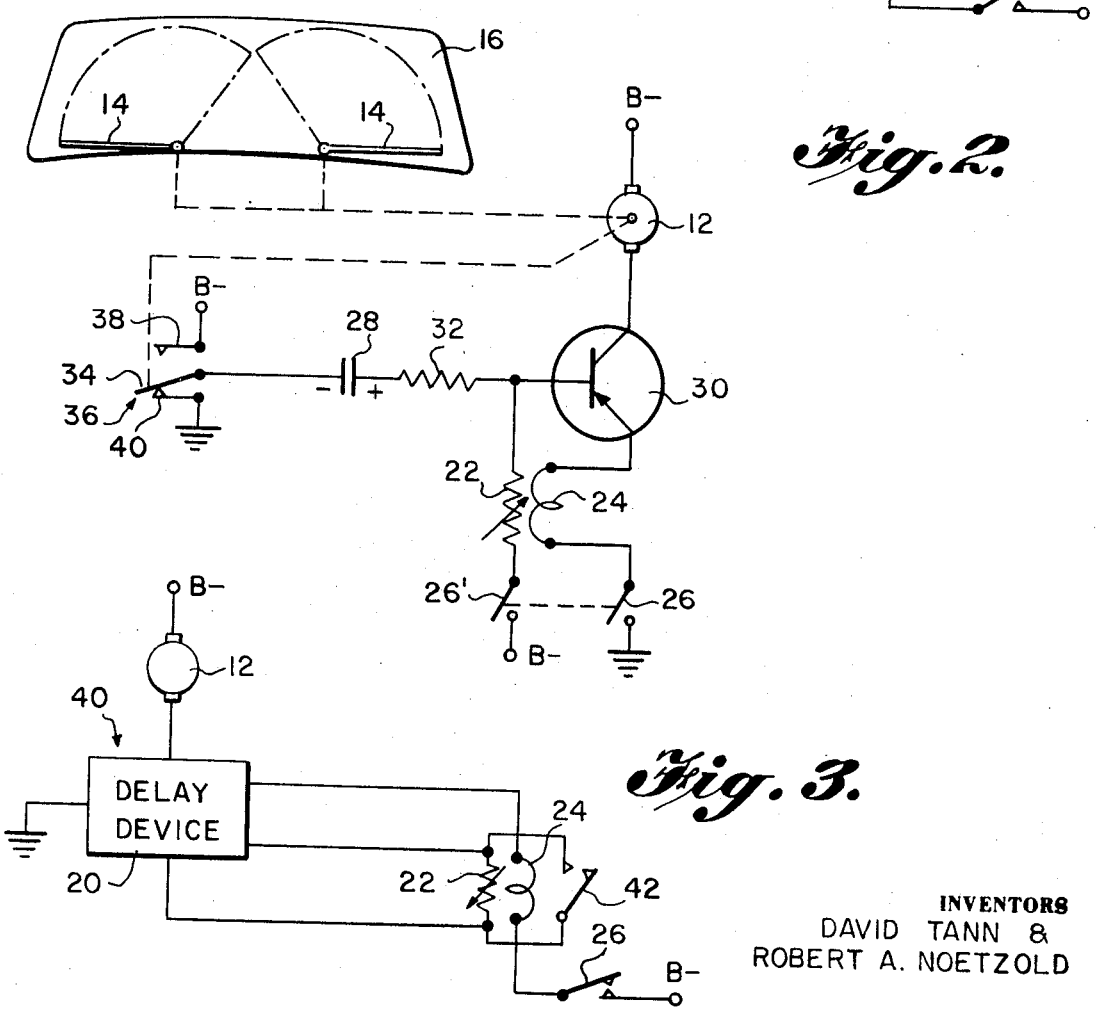
Fig. 2.
Fig. 3.
INVENTORS
DAVID TANN &
ROBERT A. NOETZOLD
BY Lane, Aitken, Dunner & Ziems
ATTORNEYS 3,643,145

INTERMITTENT CONTROL DEVICE

BACKGROUND OF THE INVENTION

U.S. Pat. No. 3,351,836 issued to R. W. Kearns on Nov. 7, 1967 and a pending application of R. W. Kearns Ser. No. 532,433 filed on Mar. 7, 1966 disclose moisture responsive windshield wiper systems wherein the wiper blades stop for a dwell period between successive wiping cycles with the length of time of the dwell periods being determined automatically by the moisture on the windshield. The dwell periods get longer when the moisture decreases and shorter when the moisture increases. When the windshield is very wet, the dwell periods are skipped to provide continuous operation until the moisture on the windshield again decreases, at which time the wiper blades automatically operate intermittently again with variable dwell periods.

The aforementioned patent and application both employ a capacitor and variable resistor for controlling the length of time of the dwell periods. The capacitor is charged during a wiping cycle and when the wiper blades stop for a dwell period at the end of a wiping cycle, the capacitor is discharged through the variable resistor and the next wiping cycle starts when the capacitor discharges to a predetermined level. In the aforementioned Kearns' application the variable resistance is varied automatically by the position at which the wiper blades coast to a stop after they have been deactivated.

SUMMARY OF THE PRESENT INVENTION

In accordance with the present invention moisture-responsive variable dwell periods are produced by automatically varying a variable resistance during a wiping cycle while the wiper blades are energized, the thereafter using the value of this resistance to determine the length of the time of the dwell period following the wiping cycle. The variable resistance increases in response to increased drag of the wiper blades on a windshield and decreases with decreased drag. At the end of the wiping cycle a capacitor which has been charged during the wiping cycle is discharged through the variable resistance to determine the length of time of the dwell period. With this arrangement, the length of time of the dwell periods is independent of the position at which the wiper blades stop. Therefore, the wiper blades can be stopped abruptly at the end of the running stroke of each wiping cycle so that they are out of the drivers line of vision during the dwell periods.

In the preferred embodiment the variable resistance is provided by a thermistor heated by a heating element which carries wiper motor current. The temperature to which the thermistor is heated during a wiping cycle is proportional to the motor current which, in turn, is proportional to the drag of the wiper blades on the windshield which, in turn, is inversely proportional to the moisture on the windshield. The aforementioned capacitor charged during the wiping cycle is discharged through the thermistor at the end of each wiping cycle to determine the time of the dwell period.

BRIEF DESCRIPTION OF THE DRAWING

The features of novelty of the present invention will be specifically pointed out or will otherwise become apparent when referring, for a better understanding to the invention, to the following description taken in conjunction with the accompanying drawing, wherein:

FIG. 1 is a schematic diagram of a windshield wiper system illustrating one embodiment of the invention;

FIG. 2 is a schematic diagram of the system of FIG. 1 illustrating one type of delay device that can be used; and FIG. 3 is a schematic diagram illustrating another embodiment of the invention.

DESCRIPTION OF THE PREFERRED EMBODIMENT

Referring to FIG. 1, a control device 10 is illustrated for activating and deactivating the electric motor of a conventional wiper motor unit 12 which, in turn, operates wiper blades 14 through repeating wiping cycles over a windshield 16. The wiping cycles begin and end with the wiper blades substantially at their turn around points indicated by the horizontal phantom lines 18 closest to the reveal moulding of the windshield.

A delay device 20 and a positive temperature coefficient thermistor 22 control the energization and deenergization of the electric motor of the wiper motor unit 12. An electric heating element 24 is connected between the delay device 20 and a B− potential provided by the vehicle battery. A switch 26 is connected in series between the heating element 24 and the potential B− for turning the wiper blades on and off.

When the switch 26 is closed the wiper motor unit 12 is energized through the delay device 20 to activate the wiper blades 14 for a complete wiping cycle. During the wiping cycle, the heating element 24 is heated by the current drawn by the electric motor of the wiper motor unit 12. At the end of the wiping cycle when the wiper blades return to the phantom lines 18, the delay device 20 automatically deenergizes the wiper motor unit and starts a dwell period.

The length of time of the dwell period is determined by the resistance of the thermistor 22 which is determined by the temperature to which the thermistor is heated during a wiping cycle by the heating element 24. When the temperature of the thermistor 22 is higher its resistance is higher and the dwell periods are longer. When the temperature of the thermistor is lower, its resistance is lower and the dwell periods are shorter.

It is well known that the current drawn by the electric motor of the wiper motor unit 12 varies significantly in response to the drag of the wiper blades on the windshield. When the windshield is relatively dry, the drag is greater, the motor current is greater and the heating element 24 heats the thermistor to a higher temperature. When the windshield is wetter, the drag is lower, the motor current is lower and the heating element 24 heats the thermistor 22 to a lower temperature. In this manner the temperature of the thermistor 22 varies directly with the drag of the wiper blades on the windshield and, therefore, inversely with the moisture on the windshield. Therefore, the control device 10 automatically increases the length of time of the dwell periods when the windshield is drier and decreases the length of time of the dwell periods when the windshield is wetter.

Referring to FIG. 2, one embodiment of the delay device 20 is illustrated which employs a capacitor 28. The positive side of the capacitor 28 is connected to the base of a transistor 30 through a resistor 32. The emitter of the transistor is connected to ground and the collector is connected to the electric motor of the wiper motor unit 12. The thermistor 22 is connected between the B− potential and the juncture between the resistor 32 and the base of the transistor 30.

The heating element 24 and switch 26 are connected in series between ground and the emitter of the transistor 30. A switch 26' actuated by the switch 26 also may be provided, if desired, between the thermistor 22 and B− potential for a purpose to be described hereinafter.

The negative side of the capacitor 28 is connected to a moveable contact 34 of a motor responsive switch 36 having stationary contacts 38 and 40. Contact 38 is connected to the B− potential provided by the battery, and contact 40 is connected to ground. The moveable contact 34 is actuated by the wiper motor unit 12 to maintain engagement with the contact 38 during a wiping cycle and to engage the contact 40 through a small angle of rotation of the wiper motor unit 12 centered about the turn around point of the wiper blades indicated by the phantom lines 18. That is, just before the wiper blades reach the end of the running stroke, the moveable contact 34 engages the contact 40 and remains in engagement through a small angle of rotation of the wiper motor unit 12 until the wiper blades turn around at the lines 18 and start back up.

As illustrated in FIG. 2, the wiper blades 18 are deactivated and in their park position. The switches 26 and 26' are open and the moveable contact 34 engages the stationary contact 40 of the motor responsive switch 36. To start the wiping operation, the switches 26 and 26' are closed by the driver of the vehicle.

This biases the transistor 30 on and energizes the electric motor of the wiper motor unit 12 to start a wiping cycle. As the wiper blades leave the park position, the moveable contact 34 is automatically tripped into engagement with the stationary contact 38. This connects the negative side of the capacitor 28 to the B− potential so that the capacitor charges through the resistor 32 which is small in comparison to the resistance of the thermistor 22. Thus, the capacitor 28 is being charged with transistor base current during the entire wiping cycle.

During the wiping cycle the heating element 24 is heated by the motor current to control the temperature of the thermistor 22, as previously described. At the end of the wiping cycle, the moveable contact 34 moves back to the contact 40 as illustrated in FIG. 2. This changes the potential on the negative side of the capacitor from B− to ground and, therefore, jumps the potential on the positive side of the capacitor to B+ plus the amount the capacitor 28 was charged during the wiping cycle. This imposes a positive potential on the base of the transistor 30 to bias it off and deenergize the motor 12 with the wiper blades in the park position, as illustrated.

The wiper blades dwell in the park position while the capacitor 28 discharges through the thermistor 22. When the capacitor discharges sufficiently so that the transistor base again becomes negative because of the B− potential at the lower end of the thermistor 22, the transistor 30 is automatically biased back on to end the dwell period and start the next wiping cycle. Since the resistance of the thermistor 22 is determined by its temperature and its temperature is determined by the heating element 24, the length of time of the dwell period will, as previously described, vary inversely with the moisture on the windshield.

If desired, the transistor 30 could be used to energize and deenergize the coil of a relay with the wiper motor unit 12 and the heating element 24 connected in series with one another by the contacts of the relay when the coil is energized by the transistor 30. With this arrangement, the transistor would carry relay coil current rather than full motor current. Also the wiping cycles can be varied to include any desired number of back and forth strokes of the wiper blades per wiping cycle.

The thermistor 22 preferably is a positive temperature coefficient thermistor of the type described in an article by R. E. Davis published in the May–June 1968 issue of Measurements and Data and entitled Temperature Sensors for Control, and in a paper entitled Positemp Thermistors appearing in Electronic Engineers Master, 1967 Edition, Section 5300. As described in the article a positive temperature coefficient thermistor exhibits a small change in resistance (less than 0.5 percent per ° C.) until it begins to reach its transition point, where the slope rapidly increases to a value of 67 percent per ° C. at about 96°–97° C., and then decreases until about 135° C. the rate of change is approximately the same as a negative temperature coefficient thermistor. The minimum and maximum current drawn by the electric motor of the wiper motor unit 12 for wet and dry windshield conditions, respectively, can be determined readily by experimentation. With this information an appropriate heating element and thermistor can be selected so that the motor current heats the thermistor in a temperature range along the rapidly increasing portion of its slope starting with the aforementioned transition point. This provides a maximum thermistor resistance change in response to changes in moisture on the windshield which, in turn, produces the most sensitive change in the length of time of the dwell periods in response to the moisture on the windshield.

Referring to FIG. 3 a control device 40 is shown which illustrates another embodiment of the invention. It differs from the control device 10 of FIG. 1 in that a bimetal strip 42 is connected in parallel with the thermistor 22 and located next to the heating element 24 so as to be heated thereby along with the thermistor 22. The bimetal strip 42 is normally closed until the heating element 24 heats it to a predetermined temperature to open the bimetal strip.

The temperature and point at which the bimetal strip opens is coordinated with the motor current so that the bimetal strip does not open during a wiping cycle if the motor current is low due to a very wet windshield condition. If the bimetal strip is not opened at the end of the wiping cycle, it shunts the thermistor 22 so that the dwell period which would have occurred at the end of the wiping cycle is skipped automatically. When the resistance of the thermistor 22 is shunted, its value is, in effect, reduced to zero. Transposing this to the transistor embodiment of FIG. 2, the transistor 30 would not be biased off at the end of the wiping cycle. It would remain on as long as the bimetal strip 42 remains closed.

When the moisture on the windshield decreases so that the drag on the wiper blades increases and the motor current increases, the bimetal strip is heated above the point at which it opens. Once this occurs and the strip opens, the control of FIG. 3 operates in the same manner as the controls of FIGS. 1 and 2 with dwell periods at the end of each wiping cycle, the length of time of the dwell periods being proportional to the resistance of the thermistor 22.

We claim:

1. In combination, wiper drive means including an electric motor for driving a wiper blade over a windshield in repeating wiping cycles, and automatic control means for activating and deactivating said drive means intermittently to drive said wiper blade through repeating wiping cycles interrupted by dwell periods, said control means including variable-resistance means and automatically varying the value of said variable-resistance means in response to the moisture on the windshield while the drive means is activated and controlling the length of time of said dwell periods in response to the value of said variable-resistance means, the length of time of the dwell periods varying inversely with the moisture on the windshield, said variable-resistance means comprising a thermistor and a heating element for varying the temperature of said thermistor, the temperature of said heating element being responsive to and proportional to the motor current, said control means including a capacitor and connecting said capacitor with said thermistor to control the length of time of said dwell period.

2. In combination, wiper drive means including an electric motor for driving a wiper blade over a windshield in repeating wiping cycles, and automatic control means for activating and deactivating said drive means intermittently to drive said wiper blades through wiping cycles interrupted by dwell periods, said control means including a thermistor and a heating element for varying the temperature of said thermistor, the temperature of said heating element being varied in response to and proportional to the motor current to automatically vary the value of said variable resistance means in response to and proportional to the drag encountered by the wiper blade on the windshield so that the length of time of the dwell periods varies inversely with the moisture on the windshield.

3. The invention as defined in claim 2 wherein said thermistor is a positive temperature coefficient thermistor.

4. In combination, wiper drive means including an electric motor for driving a wiper blade over a windshield in repeating wiping cycles, and automatic control means for activating and deactivating said motor intermittently to drive said wiper blades through wiping cycles interrupted by dwell periods, said control means including a discharge circuit having variable resistor means for determining the length of said dwell periods, said resistor means having a resistance during each dwell period initially determined directly by the level of motor current during the preceding wiping cycle, so that the resistance increases with the drag encountered by the wiper blade and the length of said dwell periods varies inversely with the moisture on the windshield.

5. The invention as defined in claim 4 wherein said discharge circuit includes a capacitive element which is charged during each wiping cycle and discharged through said variable resistor means during each dwell period.

6. The invention as defined in claim 5 wherein said variable resistor means includes a resistive element having a resistance which increases with heat and a thermal element in circuit with said motor operatively positioned for heating said resistive element in direct response to motor current.

* * * * *